(12) United States Patent
Oh-Yang et al.

(10) Patent No.: US 6,959,349 B2
(45) Date of Patent: Oct. 25, 2005

(54) WIRELESS COMPUTER PERIPHERAL INTERFACE WITH THE CAPABILITY OF IDENTIFICATION

(75) Inventors: Eric Oh-Yang, Miao-Lih Hsuan (TW); Jui-Chang Chen, Hsin-Chu (TW); Chien-Kuo Chang, Hsin-Chu (TW)

(73) Assignee: Abocom Systems, Inc., Hsin-Chu (TW)

( * ) Notice: Subject to any disclaimer, the term of this patent is extended or adjusted under 35 U.S.C. 154(b) by 115 days.

(21) Appl. No.: 10/183,319

(22) Filed: Jun. 25, 2002

(65) Prior Publication Data

US 2003/0214780 A1    Nov. 20, 2003

(30) Foreign Application Priority Data

May 17, 2002    (TW) ................................ 91110453 A

(51) Int. Cl.⁷ .............................................. G06F 3/00
(52) U.S. Cl. .............................. 710/72; 710/8; 710/13; 710/15; 710/62
(58) Field of Search ................................ 710/8, 62, 63, 710/64, 72, 73

(56) References Cited

U.S. PATENT DOCUMENTS 6,292,863 B1 * 9/2001 Terasaki et al. ............. 710/313

| | | | |
|---|---|---|---|
| 2001/0034246 A1 * | 10/2001 | Hutchison et al. | 455/557 |
| 2002/0120857 A1 * | 8/2002 | Krishnan et al. | 713/193 |
| 2002/0160661 A1 * | 10/2002 | Florescu | 439/630 |
| 2003/0018544 A1 * | 1/2003 | Nanbu et al. | 705/27 |
| 2003/0037152 A1 * | 2/2003 | Liu et al. | 709/230 |

OTHER PUBLICATIONS www.webopedia.com, Keyword: Hot Plugging.*
Quatech PCMCIA Bus Overview, http://www.quatech.com/support/comm-over-pcmcia.php, 2004.*

* cited by examiner

Primary Examiner—Kim Huynh
Assistant Examiner—Alan S. Chen
(74) Attorney, Agent, or Firm—Perkins Coie LLP

(57) ABSTRACT

The present invention includes a housing for carrying the components or circuits. The housing include a first part that is located in the slot when the present invention is inserted into the computer. The second part of the housing extends outside the slot of the computer. A wireless transmission module is set in the second part for transmitting the signal. A SIM is set also in the second part of the housing. A hot swapping protector is located in the first part of the housing and electrically coupled to the SIM for protection. A card reader is connected to the hot swapping protector and a power control module is connected to the card reader, the hot swapping protector for providing the power.

6 Claims, 1 Drawing Sheet

WIRELESS COMPUTER PERIPHERAL INTERFACE WITH THE CAPABILITY OF IDENTIFICATION

CROSS REFERENCE TO RELATED APPLICATIONS

This application claims the benefit of Taiwanese Patent Application No. 91110453 filed on May 17, 2002, which is hereby incorporated by reference in its entirety.

TECHNICAL FIELD

This invention is related to the computer peripheral device, especially to the wireless network PC card or the computer peripheral device for wireless communication.

BACKGROUND

With the constantly expansion of information technology and computer market, electrical products grow rapidly in the tendency toward smaller size, faster speed and more functions. Nowadays for the mass development of wireless device and the demand for wireless communication, the wireless modules are embedded in many advanced electrical devices, such as wireless keyboard, wireless mouse, etc. Therefore, the wireless transmitter and receiver become increasingly important. Transmission through radio or infrared rays both requires the wireless transmitter and receiver for executing signal transmitting and receiving.

Ordinary laptop or notebook both use PCMCIA card, according to the standard made by Personal Computer Memory Card International Association, and the card is usually inserted into the slot of computer. Presently the modem card and network card using PCMCIA interface is available. PCMCIA modem cards, being applied to receive data from and transmit data to the remote, have become widespread and popular computer equipment. Those who are familiar with the ordinary skills would appreciate that modem is capable of encoding binary signal information into analogy signal one.

Wireless network benefits to mobile operating staff and ISP, that is, this technology would provide significant advantage for business. In specific area, such as conference room, hotel lobby, Internet coffee shop and so on, this wireless technology could be applied to provide service of wireless communication and broadband network, hence beneficial both for user and provider. Besides, the identity recognition module could be applied to recognize the user and keep one's bill for the sake of convenience.

In view of the consideration mentioned, the security of usage gets increasingly important. Applying secret code and identification technique could help preventing the leak of data or confidentiality and recognizing the user for keeping account.

There is a subscriber identity module (SIM) which is applied in popular mobile phone system, such as GSM, DCS, PCS. Its major function is assuring the identification for the demand of the linkage between the mobile communication device and network, and locating the user. The information provided by SIM card includes user code, user identity, and security password.

SUMMARY

For the development of wireless technology, it is easy to set up a wireless network now. The chief goal of this invention is providing a wireless interface of inter-computer communication being capable of identification.

The present invention includes a housing for carrying the components or circuits. The housing include a first part that is located in the slot when the present invention is inserted into the computer. The second part of the housing extends outside the slot of the computer. A wireless transmission module is set in the second part for transmitting the signal. A SIM is set also in the second part of the housing. A hot swapping protector is located in the first part of the housing and electrically coupled to the SIM for protection. A card reader is connected to the hot swapping protector and a power control module is connected to the card reader, the hot swapping protector for providing the power.

The forgoing wireless transmission computer peripheral interface includes network card and universal serial bus (USB). The material of the second part of the housing is preferred to be plastic, for the communication of the electromagnetic wave. The mentioned second part might include a handle for inserting the network card into and drawn it out from the slot. The mentioned SIM is distributed in the second part of the housing. Hence, the hot insertion can be adapted to draw out the SIM card from the wireless transmission computer peripheral interface without turning off the computer. This is to prevent from loss and stealing.

The capability of SIM includes approval, fee collection means, and identification.

BRIEF DESCRIPTION OF THE DRAWINGS

The coming detailed description would go into particulars with the following drawing.

DETAILED DESCRIPTION

Figure 1:
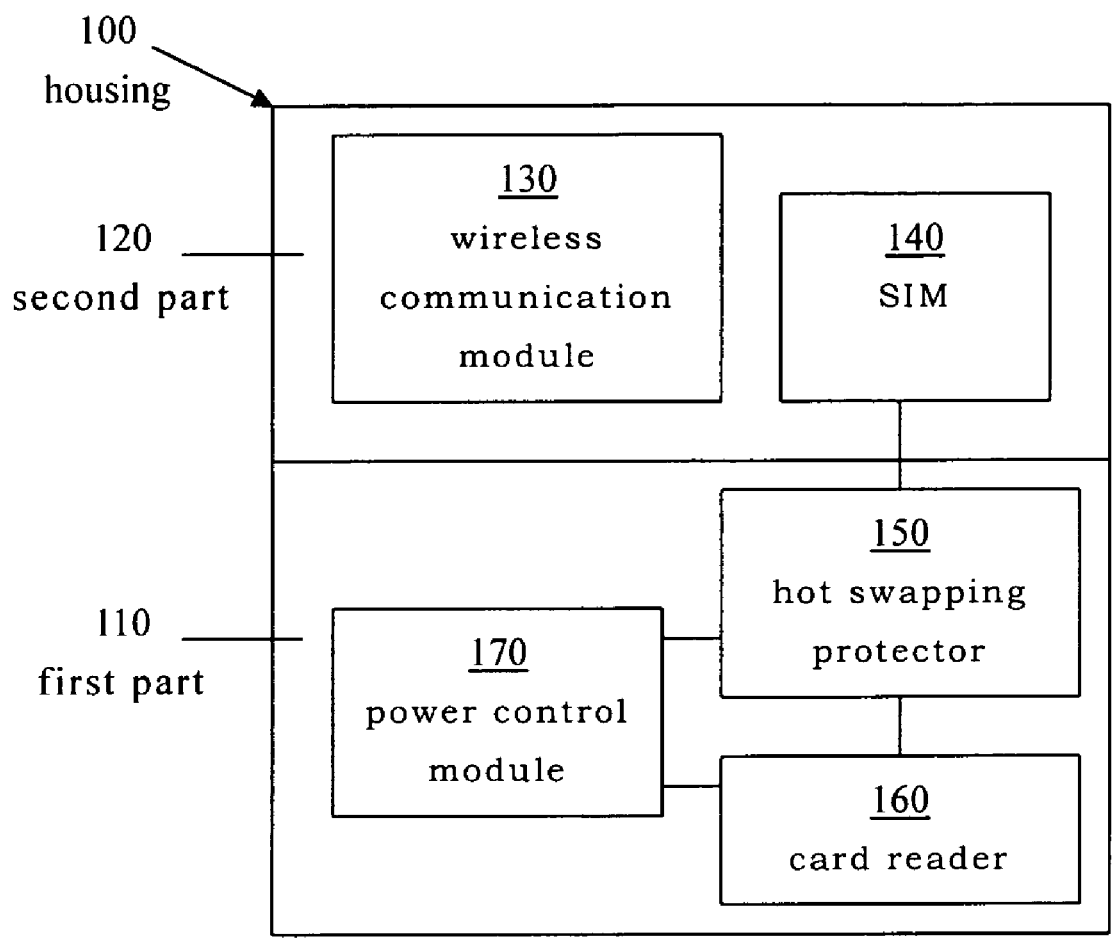
FIG. 1 is the function block diagram of this invention.

This invention discloses a wireless communication computer peripheral interface, which includes network card and USB, comprising SIM and supporting hot swapping. This invention would be illustrated as following but not restrained.

As shown in FIG. 1, this invention includes a housing 100 that carries the components or circuits and is generally composed by an upper and a lower frame made by plastic or metal. The housing 100 includes two parts, and the first part lies in the computer slot as well as the second part 120 is exposed outside when this invention is inserted in the computer. The wireless communication module 130 could be deployed in the second part for wireless communication. It is preferred that the material of the second part is plastic for the sake of the transmission and receiving of electromagnetic wave. The second part might includes a handle for inserting the wireless network card into and drawn it out from the slot.

The SIM 140 is placed in the second part 120 of the housing 100. The device of ordinary SIM of mobile phone cannot be drawn out when the power is on, and this is the situation incapable of hot swapping. In other word, the power has to be turned off and the battery has to be taken out, then the SIM card can be withdrawn. This invention is able to adapt this condition. Since the SIM 140 is placed in the second part 140 of the housing 100, the hot swapping is possible here.

The first part of the housing 100 includes the hot swapping protector 150 electrically coupled to the SIM for protection, a card reader 160 connected to the hot swapping protector 150, and a power control module 170 respectively connected to the card reader 160 and the hot swapping protector 150 for providing the power.

In conclusion, the advantage of this invention includes: the approval of wireless communication interface and the fee payment mechanism. Furthermore, the ID card of the user can be drawn out after completing the approval and identification of access some certain function to prevent the data or information from being stolen or loss. This invention is convenient to be placed in the area with wireless communication module for wireless communication. The forgoing area with wireless communication module includes conference room, station, hotel lobby, Internet coffee shop, exhibition, public place, etc.

This invention is described above, and those who are familiar with ordinary skills would appreciate the modification and revision without departing from the scope and spirit of this invention is acceptable. The protection range of this invention should obey the following claims as well as its equal domain.

We claim:

1. A wireless communication computer peripheral interface with the capability of identification, which comprises:
   a housing for carrying essential components or circuits, said housing comprising:
   a first part of said housing located in the slot of computer when said interface is inserted in said slot;
   a second part of said housing extending outside said slot when said interface is inserted in said slot;
   a wireless transformation module distributed in said second part of said housing;
   a subscriber identity module distributed in said second part of said housing;
   a hot swapping protector located in said first part of said housing and electrically coupled to said subscriber identity module for protection to allow for said subscriber identity module to be removable from said second part of said housing when power is on;
   a card reader connected to said hot swapping protector; and
   a power control module connected to said card reader and said hot swapping protector respectively for providing power.

2. A wireless communication computer peripheral interface with the capability of identification of claim 1, wherein said wireless communication computer peripheral interface includes network card and universal serial bus.

3. A wireless communication computer peripheral interface with the capability of identification of claim 1, where the material of said second part of said housing is preferred to be plastic for the communication of the electromagnetic wave.

4. A wireless communication computer peripheral interface with the capability of identification of claim 1, wherein said second part includes a handle for inserting the network card into and drawn it out from the slot.

5. A wireless communication computer peripheral interface with the capability of identification of claim 1, wherein said subscriber identity module (SIM) is distributed in said second part, hence it is allowed to adapt hot swapping, that is, drawing out the SIM card with the power on for preventing the data or information from being stolen or loss after approval and identification of access some certain function to prevent.

6. A wireless communication computer peripheral interface with the capability of identification of claim 1, wherein the function of said subscriber identity module comprises approval, fee payment mechanism, and identification.

* * * * *